(12) United States Patent
Mizuno (10) Patent No.: US 7,390,001 B2
(45) Date of Patent: Jun. 24, 2008

(54) VEHICLE SUSPENSION SYSTEM

(75) Inventor: Kazuyuki Mizuno, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 371 days.

(21) Appl. No.: 11/067,638

(22) Filed: Feb. 28, 2005

(65) Prior Publication Data

US 2005/0225050 A1    Oct. 13, 2005

(30) Foreign Application Priority Data

Apr. 8, 2004   (JP)   ............................. 2004-114366

(51) Int. Cl.
  *B60G 21/067*  (2006.01)
  *B60G 21/073*  (2006.01)
(52) U.S. Cl. .................. 280/124.104; 280/124.106; 280/124.158; 280/124.161
(58) Field of Classification Search .......... 280/124.104, 280/124.106, 124.125, 124.157, 124.158, 280/124.159, 124.16, 124.161, 5.504, 5.506, 280/5.507, 5.512, 5.513, 5.515
See application file for complete search history.

(56) References Cited

U.S. PATENT DOCUMENTS

| | | | | |
|---|---|---|---|---|
| 2,184,202 | A * | 12/1939 | Tschanz | 280/5.506 |
| 3,024,037 | A | 3/1962 | Fiala | |
| 3,032,349 | A * | 5/1962 | Fiala | 280/104 |
| 3,884,496 | A * | 5/1975 | Ito et al. | 280/6.158 |
| 4,371,182 | A * | 2/1983 | Brown | 280/6.16 |
| 4,973,077 | A * | 11/1990 | Kuwayama et al. | 280/124.107 |
| 5,401,053 | A * | 3/1995 | Sahm et al. | 280/5.502 |
| 5,447,332 | A * | 9/1995 | Heyring | 280/124.104 |
| 5,562,305 | A * | 10/1996 | Heyring | 280/5.507 |
| 5,785,344 | A * | 7/1998 | Vandewal et al. | 267/64.16 |
| 6,270,098 | B1 * | 8/2001 | Heyring et al. | 280/124.161 |

FOREIGN PATENT DOCUMENTS

| | | |
|---|---|---|
| DE | 28 10 629 A1 | 9/1979 |
| DE | 35 33 540 A1 | 4/1986 |
| DE | 36 18 055 A1 | 12/1986 |
| FR | 2 663 267 A | 12/1991 |
| JP | A 01 269606 | 10/1989 |
| JP | A 8-132846 | 5/1996 |
| WO | WO 98/47730 | 10/1998 |

* cited by examiner

Primary Examiner—Ruth Ilan
(74) Attorney, Agent, or Firm—Oliff & Berridge, PLC (57) ABSTRACT

Four shock absorbers are connected to a control cylinder. The control cylinder includes a housing body portion having two cylinder chambers which are divided by a partition wall portion; and a piston assembly which is formed by coupling two pistons with each other using a coupling rod. Two outer side control chambers and two inner side control chambers are connected to respective absorber chambers. Pressure receiving areas of outer side pressure-receiving surfaces and inner side pressure-receiving surfaces of the pistons and damping characteristics of the shock absorbers are set such that a direction in which the piston assembly moves in a region where an operation speed is low is opposite to a direction in which the piston assembly moves in a region where the operation speed is high.

11 Claims, 6 Drawing Sheets

VEHICLE SUSPENSION SYSTEM

The disclosure of Japanese Patent Application No. 2004-114366 filed on Apr. 8, 2004 including the specification, drawings and abstract is incorporated herein by reference in its entirety.

BACKGROUND OF THE INVENTION

1. Field of the Invention

The invention relates to a vehicle suspension system. More particularly, the invention relates to a vehicle suspension system including four shock absorbers which are provided so as to correspond to a left front wheel, a right front wheel, a left rear wheel and the right rear wheel; and one control cylinder which is connected to these shock absorbers.

2. Description of the Related Art

The above-mentioned type of vehicle suspension system has been known, as disclosed in, for example, U.S. Pat. No. 3,024,037. In a vehicle suspension system disclosed in U.S. Pat. No. 3,024,037, a control cylinder includes a cylinder housing, and a piston assembly which is fitted in the cylinder housing fluid-tightly and slidably. A suspension cylinder is formed by integrating a hydraulic cylinder and an air spring. The piston assembly is formed by coupling two pistons with each other using a coupling rod. A space in the cylinder housing is partitioned into two cylinder chambers by a partition wall. The pistons included in the piston assembly are fitted in respective cylinder chambers fluid-tightly and slidably. The coupling rod is fitted in the partition wall fluid-tightly and slidably so as to penetrate the partition wall. Four fluid chambers thus formed in the cylinder housing are connected to fluid chambers of fluid pressure cylinder portions of four respective suspension cylinders provided so as to correspond to the right and left wheels on the front side. In the control cylinder, an outer side pressure-receiving surface of one of the two pistons is used as a pressure-receiving surface which receives fluid pressure of the suspension cylinder corresponding to the left rear wheel, and an outer side pressure-receiving surface of the other piston is used as a pressure-receiving surface which receives fluid-pressure of the suspension cylinder corresponding to the right rear wheel. Also, an inner side pressure-receiving surface of one of the two pistons is used as a pressure-receiving surface which receives fluid pressure of the suspension cylinder corresponding to the left front wheel, and an inner side pressure-receiving surface of the other piston is used as a pressure-receiving surface which receives fluid pressure of the suspension cylinder corresponding to the right front wheel. Accordingly, for example, when a braking force is applied to a vehicle and pitching moment is applied to a vehicle body, and therefore the fluid pressure of each of the suspension cylinders corresponding to the right and left wheels on the front side is increased and the fluid pressure of each of the suspension cylinders corresponding to the right and left wheels on the rear side is decreased, the piston assembly does not move. Therefore, the four suspension cylinders are substantially independent of each other. As a result, pitching of the vehicle body is suppressed.

When rolling moment is applied to the vehicle body while the vehicle is turning and therefore the fluid pressure of each of the suspension cylinders corresponding to the front and rear wheels on the left side is increased and the fluid pressure of each of the suspension cylinders corresponding to the front and rear wheels on the right side is decreased, the fluid pressure applied to one of the two outer side pressure-receiving surfaces and the fluid pressure applied to one of the two inner side pressure-receiving surfaces are increased, and the fluid pressure applied to the other outer side pressure-receiving surface and the fluid pressure applied to the other inner side pressure-receiving surface are decreased. In this case, whether the piston assembly moves is not decided uniquely. If the piston assembly moves, the direction in which the piston assembly moves is not decided uniquely. Whether the piston assembly moves and the direction in which the piston assembly moves vary depending on a change in the fluid pressure caused in the suspension cylinder due to rolling of the vehicle body and a relationship of size between the outer side pressure-receiving surface and the inner side pressure-receiving surface. Namely, it is possible to make rolling rigidity on the front wheel side different from rolling rigidity on the rear wheel side, for example, by changing the relationship of size between the outer side pressure-receiving surface and the inner side pressure-receiving surface with respect to the same change in the fluid pressure caused in the suspension cylinder due to rolling.

Further, when one of the four wheels runs on a bump on a road, the piston assembly of the control cylinder moves, which makes it easier for the suspension cylinder corresponding to the one wheel to operate. As a result, transfer of the impact that is caused when the one wheel runs on the bump is reduced, which improves the riding comfort.

As described so far, the vehicle suspension system disclosed in U.S. Pat. No. 3,024,037 is good. However, the vehicle suspension system still has plenty of room for improvement.

SUMMARY OF THE INVENTION

It is an object of the invention to further improve rolling control performance.

In a vehicle suspension system according to the invention, damping characteristics of front wheel side shock absorbers and rear wheel side shock absorbers and pressure-receiving areas of a piston assembly for inner side control chambers and outer side control chambers are set such that a direction in which the piston assembly moves in a region where an operation speed of the front wheel side absorbers and the rear wheel side absorbers is lower than a predetermined operation speed is opposite to a direction in which the piston assembly moves in a region where the operation speed of the front wheel side absorbers and the rear wheel side absorbers is higher than the predetermined operation speed.

In the vehicle suspension system according to the invention, since absorber chambers of the four shock absorbers are connected to four respective control chambers of a control cylinder, the damping characteristics of the four shock absorbers are controlled. From that viewpoint, the absorber chambers are called controlled chambers. Generally, a shock absorber includes two absorber chambers one of which is formed on one side of a piston and the other of which is formed on the other side of the piston. Either of these two absorber chambers may be used as a controlled chamber. One of the absorber chambers on both sides of the piston is connected to a gas chamber directly or indirectly through the piston. For example, in the gas chamber, an operating fluid is stored in a lower portion and gas having high or low pressure is stored in an upper portion. The gas chamber permits a change in a total volume of the two absorber chambers due to extension/compression of the shock absorber, that is, entry/retraction of a piston rod into/from a housing. In the piston, a communication passage, which permits communication between the absorber chambers on both sides of the piston, is formed and a throttle device is provided in the communication passage. A throttle device may be provided in a communication passage which permits communication between the absorber chamber and the gas chamber. In this case, unconditional communication of the operating fluid between the absorber chamber and the gas chamber is not permitted. The above-mentioned two throttle devices control the damping characteristics of the shock absorber in cooperation. Not only in the case where the throttle device is not provided in the communication passage between the absorber chamber and the gas chamber but also in the case where the throttle device is provided in the communication passage between the absorber chamber and the gas chamber, the volume of the absorber chamber which is communicated with the gas chamber is usually changed easily, as compared to the absorber chamber which is not communicated with the gas chamber. Namely, in the absorber chamber which is communicated with the gas chamber, a change in the fluid pressure due to extension/compression of the shock absorber is usually small, as compared to the absorber chamber which is not communicated with the gas chamber. In many cases, the throttle device is provided with a plurality of valves, and the throttle effect when the shock absorber is being extended is different from the throttle effect when the shock absorber is being compressed. Therefore, it is possible to create the state in which the volume of the absorber chamber that is not communicated to the gas chamber is changed easily, as compared to the absorber chamber which is communicated with the gas chamber.

The damping characteristics of the shock absorber are usually non-linear. For example, in a region where an operation speed (extension/compression speed) of the shock absorber is lower than the predetermined operation speed, an inclination of increase in a damping force with respect to an increase in the operation speed is usually relatively large. In a region where the operation speed is higher than the predetermined operation speed, the inclination of increase is usually small. Therefore, the characteristics of a change in the fluid pressure of the controlled chamber of the shock absorber are non-linear, and therefore the characteristics of a change in the fluid pressure of the control chamber of the control cylinder are non-linear.

Then, a force applied to the piston assembly in the control cylinder is the sum of the products of fluid pressures of the four control chambers and the pressure-receiving areas for the control chambers with the direction of the force applied to the piston assembly taken into consideration. The direction in which the piston assembly moves is decided based on the direction of the force which is the sum of the products. Based on the direction in which the piston assembly moves, the shock absorber whose damping force is increased and the shock absorber whose damping force is decreased are decided.

Therefore, if the characteristics of the control cylinder and the non-linearlity of the damping characteristics of the shock absorbers are appropriately combined and used, that is, if the damping characteristics of the front wheel side absorbers and the rear wheel side absorbers and the pressure-receiving areas of the piston assembly for the inner side control chambers and the outer side control chambers are appropriately set, the direction in which the piston assembly moves in the region where the operation speed of the shock absorbers is lower than the predetermined operation speed can be made opposite to the direction in which the piston assembly moves in the region where the operation speed of the shock absorbers is higher than the predetermined operation speed. Depending on the range of the operation speed of the shock absorbers or the range of time which has elapsed since rolling is started, a damping force of each of the shock absorbers on the rear wheel side can be increased while a damping force of each of the shock absorbers on the front wheel side is decreased, or a damping force of each of the shock absorbers on the front wheel side can be increased while a damping force of each of the shock absorbers on the rear wheel side is decreased.

A first aspect of the invention relates to a vehicle suspension system including two front wheel side absorbers and two rear wheel side absorbers; a control cylinder; and a connection passage. Each of the two front wheel side absorbers includes a first absorber chamber and each of the two rear wheel side absorbers includes a second absorber chamber. The two front wheel side absorbers and two rear wheel side absorbers are provided between four respective wheel side members which rotatably support four respective wheels and four respective vehicle body side members which correspond to the respective wheel side members on a vehicle body side. The control cylinder includes (a) a piston assembly which is formed by coupling two pistons with each other using a coupling rod; and (b) a cylinder housing having two cylinder chambers which are divided by a partition wall. The coupling rod penetrates the partition wall fluid-tightly and slidably. In the control cylinder, the two pistons are fitted in the two respective cylinder chambers fluid-tightly and slidably, whereby two inner side control chambers are formed between the two respective pistons and the partition wall, and two outer side control chambers are formed on outer sides of the two respective pistons, which are opposite to the sides on which there is the partition wall. The connection passage connects the first absorber chambers of the two front wheel side absorbers to one of the respective two outer side control chambers and the respective two inner side chambers, and connects the second absorber chambers of the two rear wheel side absorbers to the other of the respective two outer side control chambers and the respective two inner side chambers. Damping characteristics of the front wheel side absorbers and the rear wheel side absorbers and pressure-receiving areas of the piston assembly for the inner side control chambers and the outer side control chambers are set such that a direction in which the piston assembly moves in a region where an operation speed of the front wheel side absorbers and the rear wheel side absorbers is lower than a predetermined operation speed is opposite to a direction in which the piston assembly moves in a region where the operation speed of the front wheel side absorbers and the rear wheel side absorbers is higher than the predetermined speed.

A second aspect of the invention relates to a vehicle suspension system including two front wheel side absorbers and two rear wheel side absorbers; a control cylinder; and a connection passage. Each of the two front wheel side absorbers includes a first absorber chamber and each of the two rear wheel side absorbers includes a second absorber chamber. The two front wheel side absorbers and two rear wheel side absorbers are provided between four respective wheel side members which rotatably support four respective wheels and four respective vehicle body side members which correspond to the respective wheel side members on a vehicle body side. The control cylinder includes (a) a piston assembly which is formed by coupling two pistons with each other using a coupling rod; and (b) a cylinder housing having two cylinder chambers which are divided by a partition wall. The coupling rod penetrates the partition wall fluid-tightly and slidably. In the control cylinder, the two pistons are fitted in the two respective cylinder chambers fluid-tightly and slidably, whereby two inner side control chambers are formed between the two respective pistons and the partition wall, and two outer side control chambers are formed on outer sides of the two respective pistons, which are opposite to the sides on which there is the partition wall. The connection passage connects the first absorber chambers of the two front wheel side absorbers to one of the respective two outer side control chambers and the respective two inner side chambers, and connects the second absorber chambers of the two rear wheel side absorbers to the other of the respective two outer side control chambers and the respective two inner side chambers. Damping characteristics of the front wheel side absorbers and the rear wheel side absorbers and the pressure-receiving areas of the piston assembly for the inner side control chambers and the outer side control chambers are set such that an increasing rate of a damping force of each of the two front wheel side absorbers is made higher than an increasing rate of a damping force of each of the two rear wheel side absorbers by the control cylinder in a region where an operation speed of the front wheel side absorbers and the rear wheel side absorbers is lower than a first predetermine operation speed.

The damping characteristics of the front wheel side absorbers and the rear wheel side absorbers and the pressure-receiving areas of the piston assembly may be set such that the damping force of each of the rear wheel side absorbers is increased by the cylinder while the damping force of each of the front wheel side absorbers is decreased by the cylinder in a region where the operation speed of the front wheel side absorbers and the rear wheel side absorbers is lower than a second predetermined operation speed, and the damping force of each of the rear wheel side absorbers is decreased by the cylinder while the damping force of each of the front wheel side absorbers is increased by the cylinder in a region where the operation speed of the front wheel side absorbers and the rear wheel side absorbers is higher than the second predetermined operation speed.

The damping characteristics of the front wheel side absorbers and the rear wheel side absorbers and the pressure-receiving areas of the piston assembly may be set such that the damping force of each of the rear wheel side absorbers is larger than the damping force of each of the front wheel side absorbers in a region where the operation speed of the front wheel side absorber and the rear wheel side absorber is lower than a third predetermined operation speed, and the damping force of each of the front wheel side absorbers is larger than the damping force of each of the rear wheel side absorbers in a region where the operation speed of the front wheel side absorbers and the rear wheel side absorbers is higher than the third predetermined operation speed.

The first absorber chambers of the front wheel side absorbers may be connected to the respective inner side control chambers of the control cylinder, and the second absorber chambers of the rear wheel side absorbers may be connected to the respective outer side control chambers. Also, the first absorber chambers of the front wheel side absorbers may be connected to the outer side control chambers, and the second absorber chambers of the rear wheel side absorbers may be connected to the inner side absorber chambers. However, it has become obvious by an experiment that the effects of the invention can be obtained further efficiently when the first absorber chambers of the front wheel side absorbers are connected to the respective inner side control chambers of the control cylinder, and the second absorber chambers of the rear wheel side absorbers are connected to the respective outer side control chambers.

Each of the two front wheel side absorbers may further include a third absorber chamber, and each of the two rear wheel side absorbers may further include a fourth absorber chamber.

The first absorber chambers and the third absorber chambers may be formed such that a fluid pressure of the first absorber chamber increases when each of the front wheel side absorbers is being extended, and the second absorber chambers and the fourth absorber chambers may be formed such that a fluid pressure of the second absorber chamber increases when each of the rear wheel side absorbers is being extended. The effects of the invention can be obtained even if the first absorber chambers and the third absorber chambers are formed such that a fluid pressure of the first absorber chamber decreases when each of the front wheel side absorbers is being extended, and the second absorber chambers and the fourth absorber chambers are formed such that a fluid pressure of the second absorber chamber decreases when each of the rear wheel side absorbers is being extended. However, it has become obvious by an experiment that the effects of the invention can be obtained further efficiently when the absorber chambers are formed such that a fluid pressure of the first absorber chamber connected to the control cylinder increases when each of the front wheel side absorbers is being extended and a fluid pressure of the second absorber chamber connected to the control cylinder increases when each of the rear wheel side absorbers is being extended. The reason is currently estimated as follows. The damping force of the shock absorber is usually set such that the damping force when the shock absorber is being extended is larger than the damping force when the shock absorber is being compressed. When the absorber chamber on the side where the damping force is larger is connected to the control cylinder, if one wheel runs on a bump on a road or if the two wheels diagonally opposite to each other are moved in the same direction, it is easy to extend the two shock absorbers corresponding to the other two wheels diagonally opposite to each other. Therefore, it is estimated the impact on the vehicle body is suppressed.

The configuration may be such that the first absorber chambers are not connected to gas chambers, the third absorber chambers are connected to the gas chambers directly or through a piston, the second absorber chambers are not connected to the gas chambers, and the fourth absorber chambers are connected to the gas chambers directly or through the piston. Also, the effects of the invention can be obtained even when the third absorber chambers and the fourth absorber chambers are connected to the control cylinder. However, it has become obvious by an experiment that the effects of the invention can be obtained further efficiently when the first absorber chambers and the second absorber chambers, which are not connected to the gas chamber, are connected to the control cylinder. The reason is estimated as follows. A change in the fluid pressure in the absorber chamber which is not connected to the gas chamber is larger than a change in the fluid pressure in the absorber chamber which is connected to the gas chamber. The effects of the control cylinder can be obtained further efficiently when the absorber chambers on the side where the change in the fluid pressure is larger are connected to the control cylinder.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereafter, an embodiment of the invention will be described in detail with reference to accompanying drawings.

Figure 1:
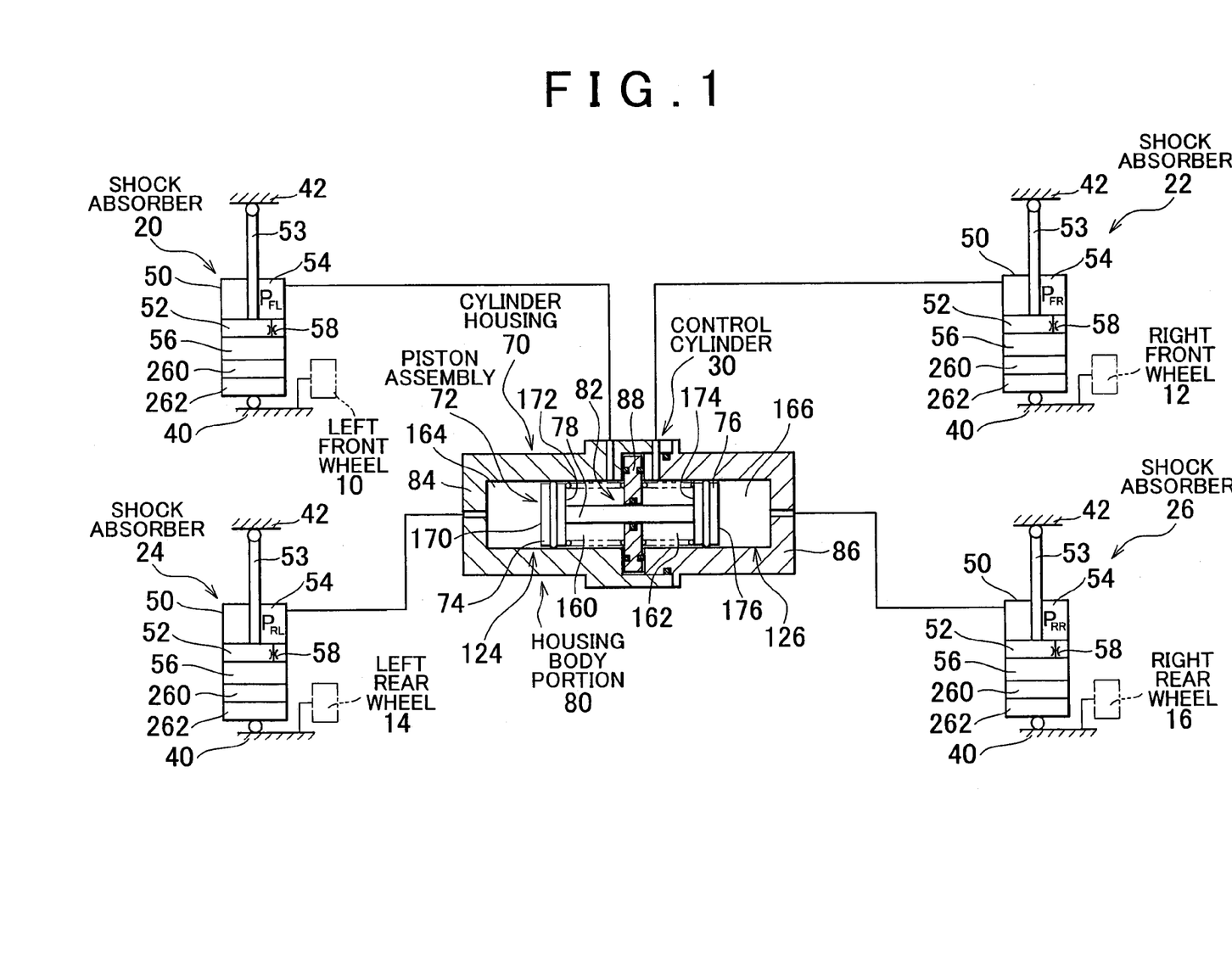
FIG. 1 is a diagram showing a vehicle suspension system according to an embodiment of the invention.

As shown in FIG. 1, a vehicle suspension system according to the embodiment is provided in a vehicle having four wheels, that are, a left front wheel 10, a right front wheel 12, a left rear wheel 14 and the right rear wheel 16. The vehicle suspension system includes four shock absorbers 20, 22, 24 and 26 which are provided so as to correspond to the wheels 10, 12, 14 and 16, respectively, and a control cylinder 30 which is connected to the shock absorbers 20 to 26.

Each of the shock absorbers 20 to 26 is provided between a wheel side member 40 and a vehicle body side member 42. Each of the shock absorbers 20 to 26 includes a cylinder housing 50 (hereinafter, referred to as a "housing 50"); a piston 52 which is fitted in the housing 50 fluid-tightly and slidably; and a piston rod 53 which extends from the piston 52 to the outside of the housing 50. In the embodiment, the housing 50 is attached to the wheel side member 40, and the piston rod 53 is attached to the vehicle body side member 42. A communication passage, which permits communication between two absorber chambers (fluid chambers) 54 and 56 that are divided by the piston 52, is provided in the piston 52. A throttle device 58 is provided in the communication passage. A damping force corresponding to a speed of movement of the piston 52 with respect to the housing 50 (a flow speed of operating fluid flowing through the throttle device 58) is generated by the throttle device 58.

The control cylinder 30 will be described in detail. The control cylinder 30 includes a cylinder housing (hereinafter, referred to as a "housing") 70, and a piston assembly 72 which is fitted in the housing 70 fluid-tightly and slidably. In the embodiment, the piston assembly 72 is formed by coaxially coupling two pistons 74 and 76 with each other using a coupling rod 78. In the embodiment, the coupling rod 78 constitutes a coupling portion.

Figure 2:
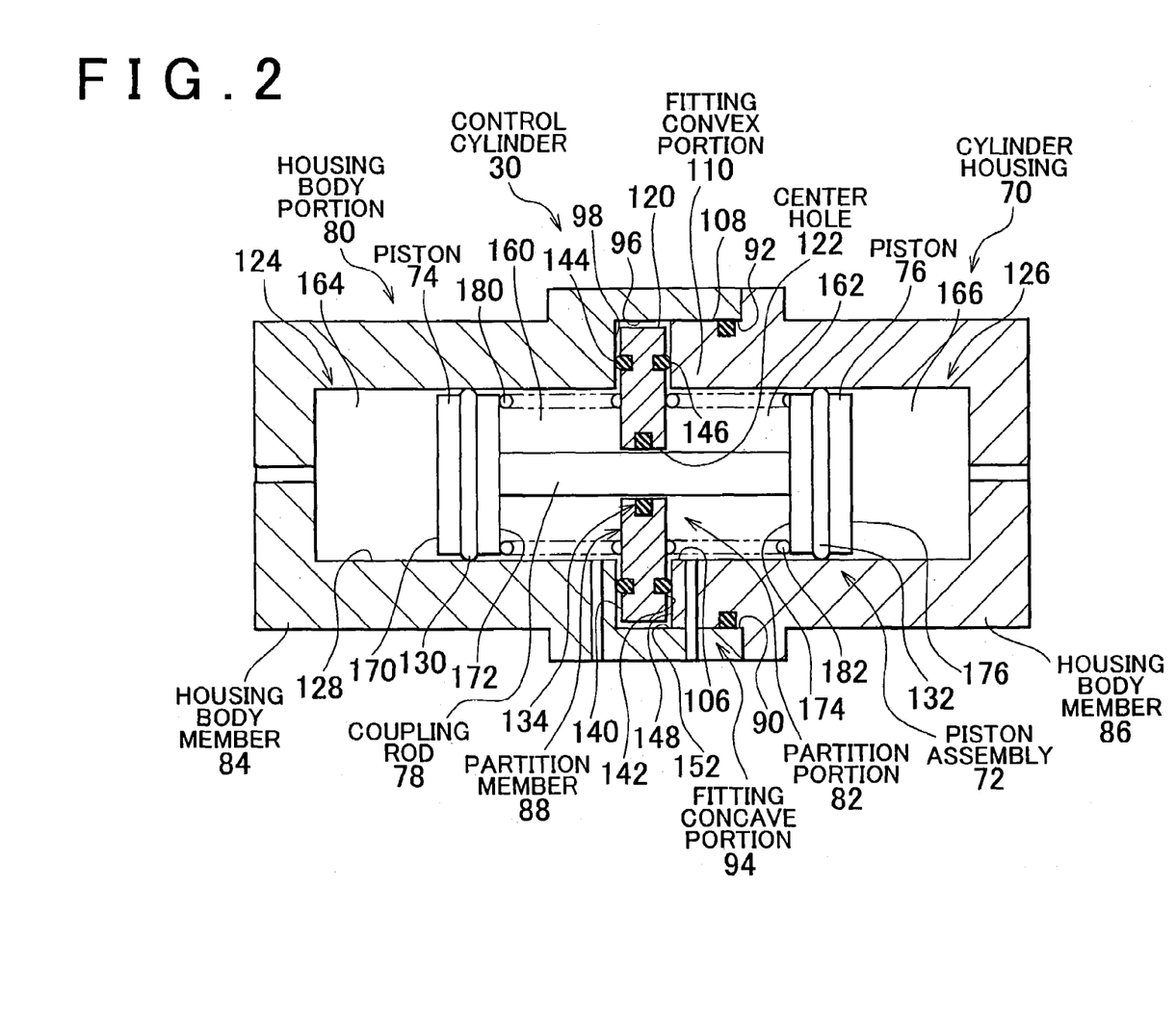
FIG. 2 is a front cross sectional view showing a control cylinder in FIG. 1.

As shown in FIG. 2, the housing 70 includes a housing body portion 80 and a partition portion 82 which are independent of each other. In the embodiment, two housing body members 84 and 86 constitute the housing body portion 80, and one partition member 88 constitutes the partition portion 82. Each of the housing body members 84 and 86 is a hollow cylindrical member having a bottom at one end and an opening at the other end. The housing body members 84 and 86 constitute a first housing body portion and a second housing body portion, respectively. A fitting concave portion 94 is formed in the housing body member 84 at a rim portion of an opening 92. The fitting concave portion 94 has an inner surface 96 and a shoulder surface 98 which extends inward in the radial direction from an inner end of the inner surface 96, which is on the opposite side of the opening 92. The internal diameter of housing body member 86 is equal to that of the housing body member 84. An end portion of the housing body member 86 on the side of an opening 106 is fitted to the inner surface 96 at an outer surface 108, and the end portion serves as a fitting convex portion 110 which is fitted to the fitting concave portion 94.

The housing body member 84 and the housing body member 86 are attachably/detachably fixed to each other by a fixing device such as a bolt and a nut at flange portions (not shown) with the fitting convex portion 110 fitted to the fitting concave portion 94. In this state, a clearance for permitting the partition member 88 to move for a limited distance is formed between an end surface of the fitting convex portion 110 and the shoulder surface 98 of the fitting concave portion 94. In the embodiment, the partition member 88 has a disc shape, and is fitted in the fitting concave portion 94 with a clearance in the radial direction formed between the inner surface 96 of the fitting concave portion 94 and an outer surface 120 of the partition member 88. Thus, the internal space of the housing body portion 80 is partitioned into two cylinder chambers 124 and 126.

As mentioned above, the piston assembly 72 is formed by coaxially coupling the two pistons 74 and 76 using the coupling rod 78. The coupling rod 78 is fitted in a center hole 122 which is formed so as to penetrate a center portion of the partition member 88, and the two pistons 74 and 76 are fitted in the two cylinder chambers 124 an 126 in the housing body portion 80, respectively. In order to fit the coupling rod 78 in the center hole 122, at least one of the two pistons 74 and 76 of the piston assembly 72 is prepared separately from the coupling rod 78, and the coupling rod 78 is integrated with the pistons 74 and 76 by screwing or the like after attachment of the partition member 88.

The pistons 74 and 76 of the piston assembly 72 have O-rings 130 and 132, respectively, and an O-ring 134 is provided for the center hole 122 of the partition member 88. Further, O-rings 144 and 146 are provided in end surfaces 140 and 142 of an outer portion of the partition member 88, respectively. The O-rings 130, 132, 134, 144, and 146 are made of rubber and elastically deformable seal members. The housing body portion 80 and the partition member 88 can move in parallel and tilt with respect to each other; the partition member 88 and the piston assembly 72 can move in parallel and tilt with respect to each other; and the piston assembly 72 and the housing body portion 80 can move in parallel and tilt with respect to each other (hereinafter, the movement and tilt are collectively referred to as "relative movement") with the O-rings 130, 132, 134, 144 and 146 being elastically deformed in a range in which sealability of these O-rings is not lost. The limits of the relative movements are defined by the sizes of the clearances formed among the piston assembly 72, the housing body portion 80 and the partition member 88. However, the relative movement of the housing body portion 80 and the partition member 88 in parallel and in the radial direction of the piston assembly 72 (the direction perpendicular to the axial direction) and the relative movement of the piston assembly 72 and the housing body portion 80 in parallel are not affected by the restriction of "relative movement in the range in which sealability of the O-rings is not lost". Therefore, the relative movement of the housing body portion 80 and the partition member 88 in parallel and in the radial direction of the piston assembly 72 and the relative movement of the piston assembly 72 and the housing body portion 80 in parallel are permitted at a high degree.

As mentioned above, when the piston assembly 72 is fitted in the housing 70, the four fluid chambers are formed in the housing 70. A fluid chamber 160 is formed between the partition member 88 and the piston 74 and a fluid chamber 162 is formed between the partition member 88 and the piston 76. Also, a fluid chamber 164 is formed on the opposite side of the fluid chamber 160 with respect to the piston 74, and a fluid chamber 166 is formed on the opposite side of the fluid chamber 162 with respect to the piston 76. The piston 74 has an outer side pressure-receiving surface 170 on the side of the fluid chamber 164 which is the outer side fluid chamber, and an inner side pressure-receiving surface 172 on the side of the fluid chamber 160 which is the inner side fluid chamber. The piston 76 has an inner side pressure-receiving surface 174 on the side of the fluid chamber 162 which is the inner side fluid chamber, and an outer side pressure-receiving surface 176 on the side of the fluid chamber 166 which is the outer side fluid chamber.

The outer side pressure-receiving surface 170 receives fluid pressure of the absorber chamber 54 of the shock absorber 24 corresponding to the left rear wheel 14, which is connected to the fluid chamber 164, and the outer side pressure-receiving surface 176 receives fluid pressure of the absorber chamber 54 of the shock absorber 26 corresponding to the right rear wheel 16, which is connected to the fluid chamber 166. Also, the inner side pressure-receiving surface 172 receives fluid pressure of the absorber chamber 54 of the shock absorber 20 corresponding to the left front wheel 10, which is connected to the fluid chamber 160, and the inner side pressure-receiving surface 174 receives fluid pressure of the absorber chamber 54 of the shock absorber 22 corresponding to the right front wheel 12, which is connected to the fluid chamber 162. In the embodiment, the fluid chambers 160 to 166 of the control cylinder 30 are the fluid pressure chambers to which fluid pressure is applied.

In the embodiment, a spring 180 is provided between the piston 74 and the partition member 88, and a spring 182 is provided between the piston 76 and the partition member 88, each of the springs 180 and 182 being an elastic member that is a kind of an urging device. The springs 180 and 182 are used to return the pistons 74 and 76 to the neutral position, respectively. In the embodiment, the spring 180 is provided on the inner side of the piston 74, and the spring 182 is provided on the inner sides of the piston 76.

Figure 3:
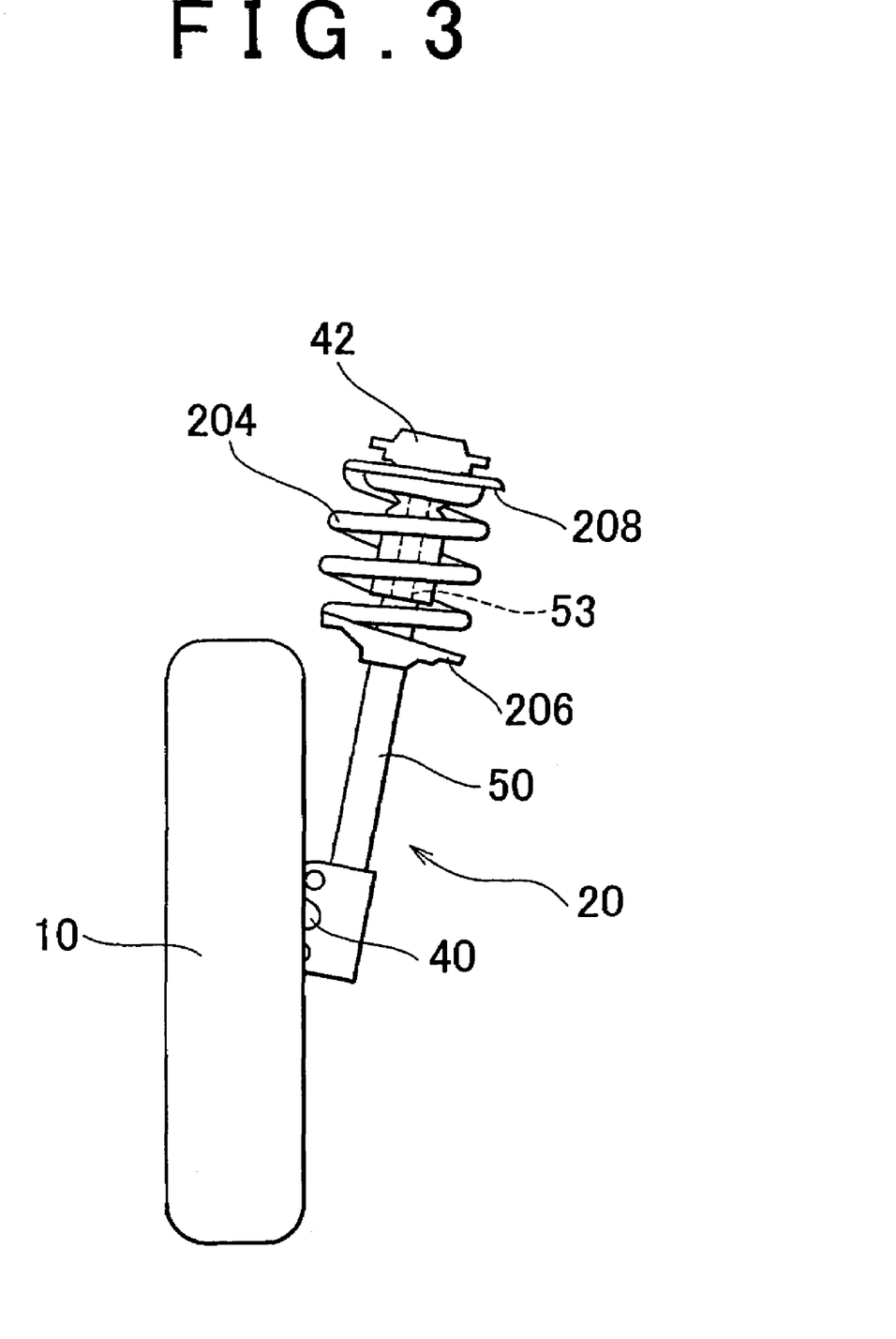
FIG. 3 is a front view showing an attachment state of a shock absorber shown in FIG. 1.

Next, the shock absorbers 20 to 26 will be described in detail. The shock absorbers 20 to 26 have the same structure. Therefore, description will be made by taking the shock absorber 20 corresponding to the left front wheel 10 as an example. As shown in FIG. 3, the housing 50 of the shock absorber 20 is attached to the wheel side member 40 through a bracket, and the piston rod 53 is attached to the vehicle body side member 42. Also, a spring 204 is provided between a lower seat 206 attached to the housing 50 and an upper seat 208 attached to the vehicle body side member 42.

Figure 4:
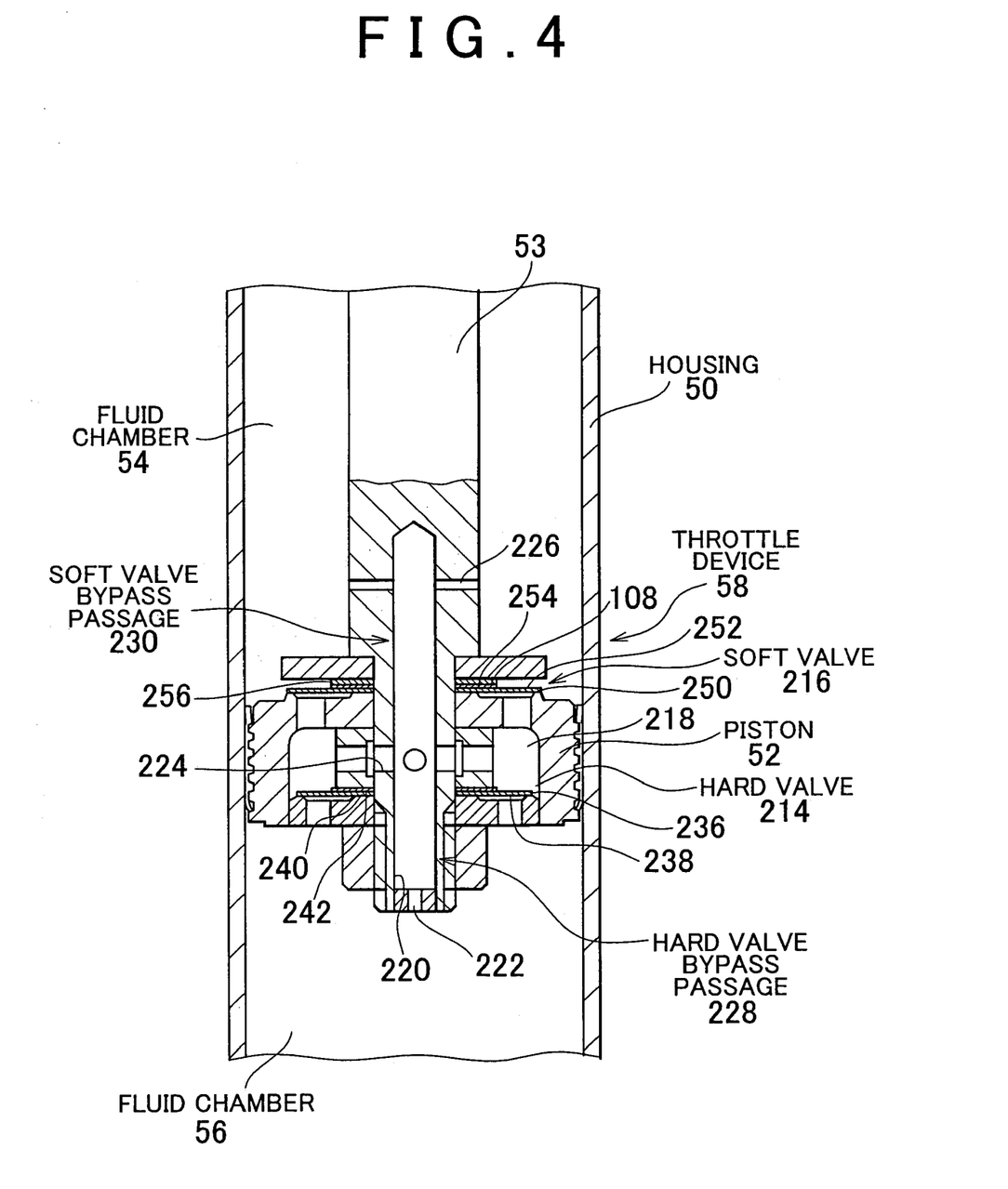
FIG. 4 is a front cross sectional view showing a main portion of the shock absorber.

As shown in FIG. 4, the throttle device 58 of the shock absorber 20 includes a hard valve 214 and a soft valve 216. The hard valve 214 is provided on the side of the fluid chamber 56 of the piston 52, the soft valve 216 is provided on the side of the absorber chamber 54, and an intermediate chamber 218 is formed between the hard valve 214 and the soft valve 216. Also, an axial direction hole 220, which extends in the axial direction and which opens into the fluid chamber 56, is formed in the piston rod 53. A fixed throttle 222 is provided at an opening portion of the axial direction hole 220 on the side of the fluid chamber 56. Communication between the axial direction hole 220 and the intermediate chamber 218 is permitted by a communication hole 224 extending in the radial direction, and a fixed throttle 226 is provided between an end portion of the axial direction hole 220 and the absorber chamber 54. The intermediate chamber 218, the communication hole 224, the axial direction hole 220, the fixed throttle 222 and the like constitute a hard valve bypass passage 228. The fixed throttle 226, the axial direction hole 220, the communication hole 224, the intermediate chamber 218 and the like constitute a soft valve bypass passage 230.

The hard valve 214 includes a valve seat 236 provided in a lower portion of the piston 52; a leaf valve 238 which has a substantially circular thin plate shape; a positioning member 240 which is provided on an inner peripheral side of the leaf valve 238; and an intermediate chamber side seat member 242 which is provided on an upper side of an end portion of the leaf valve 238 on the inner peripheral side. The intermediate chamber side seat member 242 is configured to receive a force which is applied to the leaf valve 238 and which is transmitted from the fluid chamber 56 to the intermediate chamber 218. The leaf valve 238 is supported by the valve seat 236 and the intermediate chamber side seat member 242 while being elastically deformed in the state where an upper surface of the leaf valve 238 faces the intermediate chamber 218 and the lower surface thereof faces the fluid chamber 56.

When the fluid pressure of the fluid chamber 56 is higher than the fluid pressure of the intermediate chamber 218 by a predetermined value or more, the end portion of the leaf valve 238 on the inner peripheral side is pressed to the intermediate chamber side seat member 242, and an outer peripheral side portion is deflected upward. When the fluid pressure of the intermediate chamber 218 is higher than the fluid pressure of the fluid chamber 56 by a predetermined value or more, the end portion on the outer peripheral side is pressed to the valve seat 236, and an inner peripheral side portion is deflected downward. In the leaf valve 238, the inner peripheral side portion is hard to deflect as compared to the outer peripheral side portion. Therefore, the hard valve 214 is hard to open in the case where the piston rod 53 is being retracted from the housing 50, as compared to the case where the piston rod 53 is entering the housing 50. Generally, it is desirable that the damping force generated in the shock absorber 20 be large in the case where the piston rod 53 is being retracted from the housing 50, as compared to the case where the piston rod 53 is entering the housing 50.

The soft valve 216 has a structure similar to that of the hard valve 214. The soft valve 216 includes a valve seat 250; a leaf valve 252; a positioning member 254; a fluid chamber side seat member 256 and the like. The soft valve 216 is hard to open in the case where the piston rod 53 is being retracted from the housing 50, as compared to the case where the piston rod 53 is entering the housing 50. In the embodiment, the outer diameter of the leaf valve 252 is larger than the outer diameter of the leaf valve 238 (the ratio of the outer diameter to the internal diameter is large). The soft valve 216 is easy to open, as compared to the hard valve 214.

A piston 260 and a gas chamber 262 are provided in the shock absorber 20 on the side of the fluid chamber 56. The volume of the space in the housing 50 is permitted to be increased/decreased as the piston rod 53 enters the housing 50 or the piston rod 53 is retracted from the housing 50. Compressed gas is sealed in the gas chamber 262.

Figure 5:
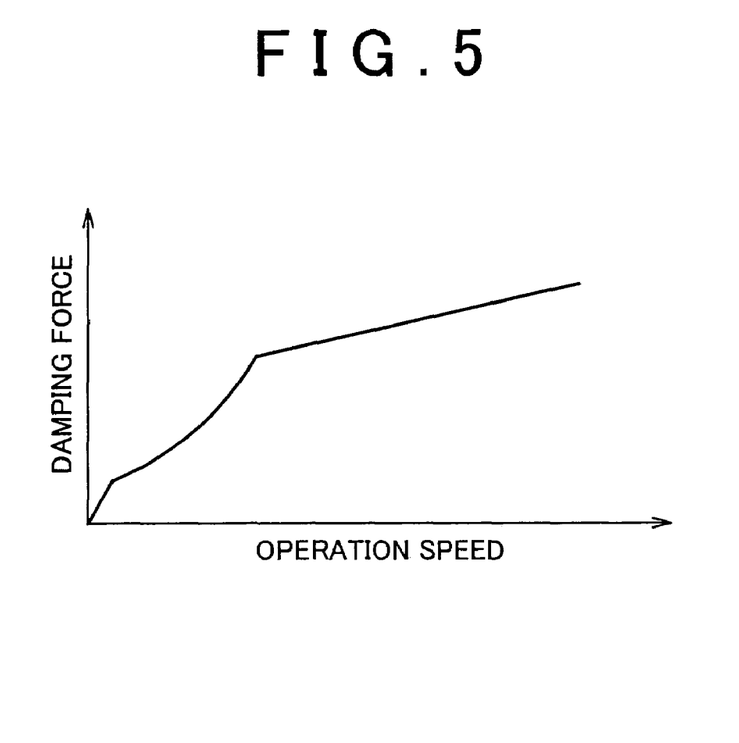
FIG. 5 is a graph for describing an operation of the vehicle suspension system.

The thus configured shock absorber 20 operates as follows. When the distance between the wheel side member 40 and the vehicle body side member 42 becomes large, an upward force (a force to make the piston rod 53 be retracted from the housing 50) is applied to the piston 52, and the fluid pressure of the absorber chamber 54 becomes higher than the fluid pressure of the fluid chamber 56. The operating fluid in the absorber chamber 54 flows to the fluid chamber 56 through the soft valve bypass passage 230 and the hard valve bypass passage 228. When the fluid pressure of the absorber chamber 54 is higher than the fluid pressure of the intermediate chamber 218 by a valve opening pressure of the soft valve 216 or more, the soft valve 216 is opened, and part of the operating fluid is made to flow through the soft valve 216 and the hard valve bypass passage 228. When the fluid pressure of the intermediate chamber 218 becomes higher than the fluid pressure of the fluid chamber 56 by a valve opening pressure of the hard valve 214 or more, the hard valve 214 is opened. As a result, the operating fluid flows to the fluid chamber 56 through the soft valve 216 or the soft valve bypass passage 230 and the hard valve 214 or the hard valve bypass passage 228. As a result, the damping force is controlled as shown in FIG. 5.

When the distance between the wheel side member 40 and the vehicle body side member 42 becomes small and a downward force (a force to make the piston rod 53 enter the housing 50) is applied to the piston 52, the fluid pressure of the fluid chamber 56 becomes higher than the fluid pressure of the absorber chamber 54. The operating fluid in the fluid chamber 56 flows to the absorber chamber 54 through the hard valve bypass passage 228 or the hard valve 214 and the soft valve bypass passage 230 or the soft valve 216. In the soft valve 216, the outer peripheral side portion of the leaf valve 252 is deflected. In the hard valve 214 as well, the outer peripheral side portion of the leaf valve 238 is deflected. The damping force is controlled such that the damping force while the piston rod 53 is entering the housing 50 changes in the similar manner as the damping force while the piston rod 53 is being retracted from the housing 50 although the degree of the damping force while the piston rod 53 is entering the housing 50 is different from the degree of the damping force while the piston rod 53 is being retracted from the housing 50.

The operation of the thus configured vehicle suspension system will be described in detail. Forces corresponding to the fluid pressures of the absorbers 20 to 26 corresponding to the four wheels 10 to 16 (forces each of which is expressed by a product of the fluid pressure and the pressure-receiving area) are applied to the piston assembly 72. When the vehicle is at a standstill or running at a constant speed, these forces are balanced and the piston assembly 72 does not move.

When rolling moment is applied to the vehicle body, for example, if the vehicle is turned to the left and the distance between the wheel side member 40 and the vehicle body side member 42 is increases on the left side of the vehicle and the distance between the wheel side member 40 and the vehicle body side member 42 is decreased on the right side of the vehicle, the fluid pressure of the absorber chamber 54 of the shock absorber 20 corresponding to the left front wheel 10 and the fluid pressure of the absorber chamber 54 of the shock absorber 24 corresponding to the left rear wheel 14 increase, and the fluid pressure of the absorber chamber 54 of the shock absorber 22 corresponding to the right front wheel 12 and the fluid pressure of the absorber chamber 54 of the shock absorber 26 corresponding to the right rear wheel 16 decrease. The fluid pressure which is applied to the outer side pressure-receiving surface 170 and the fluid pressure which is applied to the inner side pressure-receiving surface 172 increase, and the fluid pressure which is applied to the inner side pressure-receiving surface 174 and the fluid pressure which is applied to the outer side pressure-receiving surface 176 decrease. In this case, the piston assembly 72 moves as follows.

Figure 6:
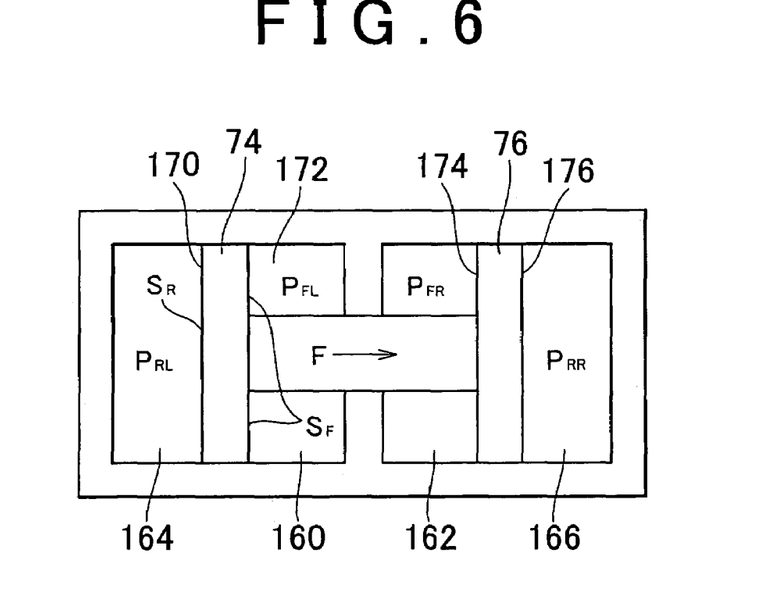
FIG. 6 is a diagram for describing the operation of the vehicle suspension system.

As shown in FIG. 6, in the case where the pressure-receiving area of each of the outer side pressure-receiving surface 170 of the piston 74 and the outer side pressure-receiving surface 176 of the piston 76 is $S_R$, the pressure-receiving area of each of the inner side pressure-receiving surface 172 of the piston 74 and the inner side pressure-receiving surface 174 of the piston 76 is $S_F$, the fluid pressures of the fluid chambers 160, 162, 164 and 166 are $P_{FL}$, $P_{FR}$, $P_{RL}$, and $P_{RR}$, respectively, and the rightward force applied to the piston assembly 72 is F, the relationship among these can be expressed as follows, $$F=P_{RL}\times S_R+P_{FR}\times S_F-P_{FL}\times S_F-P_{RR}\times S_R=(P_{RL}-P_{RR})\times S_R-(P_{FL}-P_{FR})\times S_F.$$

Also, in the case where $(P_{RL}-P_{RR})=\Delta P_R$ and $(P_{FL}-P_{FR})=\Delta P_F$, the force F can be expressed as follows, $F=\Delta P_R\times S_R-\Delta P_F\times S_F$. When F is a positive value, that is, when $\Delta P_R\times S_R>\Delta P_F\times S_F$, the piston assembly 72 moves rightward in FIG. 6. When $\Delta P_R\times S_R<\Delta P_F\times S_F$, the piston assembly 72 moves leftward in FIG. 6. In this case, $\Delta P_R$ is a fluid pressure difference which occurs between the absorber chamber 54 of the shock absorber 24 corresponding to the left rear wheel 14 and the absorber chamber 54 of the shock absorber 26 corresponding to the right rear wheel 16, and $\Delta P_F$ is a fluid pressure difference which occurs between the absorber chamber 54 of the shock absorber 20 corresponding to the left front wheel 10 and the absorber chamber 54 of the shock absorber 22 corresponding to the right front wheel 12.

Figure 7:
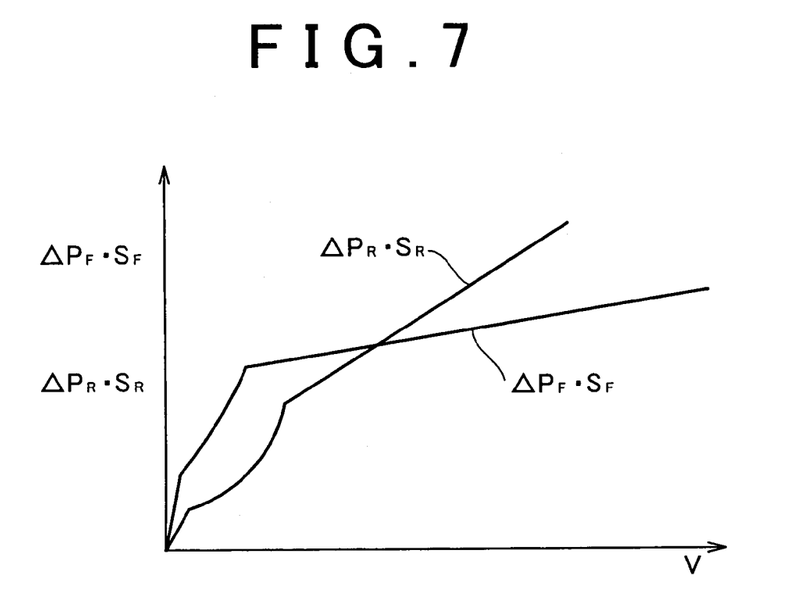
FIG. 7 is a graph for describing the operation of the vehicle suspension system.

In the embodiment, as shown in FIG. 7, the damping characteristics of the shock absorbers 20 to 26 and the pressure-receiving areas $S_R$ and $S_F$ of each of the pistons 74 and 76 are set such that, in the early stage of steering for left turn, that is, while a rolling speed V is low, $\Delta P_R\times S_R<\Delta P_F\times S_F$ is satisfied, and $\Delta P_R\times S_R>\Delta P_F\times S_F$ is satisfied during the other times. In FIG. 7, $\Delta P_R\times S_R$ and $\Delta P_F\times S_F$ are shown on the assumption that the form of a characteristic line of the damping force when each of the shock absorber 20 to 26 is being extended is the same as the form of a characteristic line of the damping force when each of the shock absorbers 20 to 26 is being compressed (positions of bend points in the horizontal axis direction) though the degree of the damping force when each of the shock absorber 20 to 26 is being extended is different from the degree of the damping force when each of the shock absorbers 20 to 26 is being compressed, for the purpose of simplifying the description. However, in actuality, the forms of the characteristic lines are usually different. The lines showing $\Delta P_R\times S_R$ and $\Delta P_F\times S_F$ are similar to the sum of the characteristic line when each of the shock absorbers 20 to 26 is being extended and the characteristic line when each of the shock absorber 20 to 26 is being compressed, and there are more the bend points.

Figure 8:
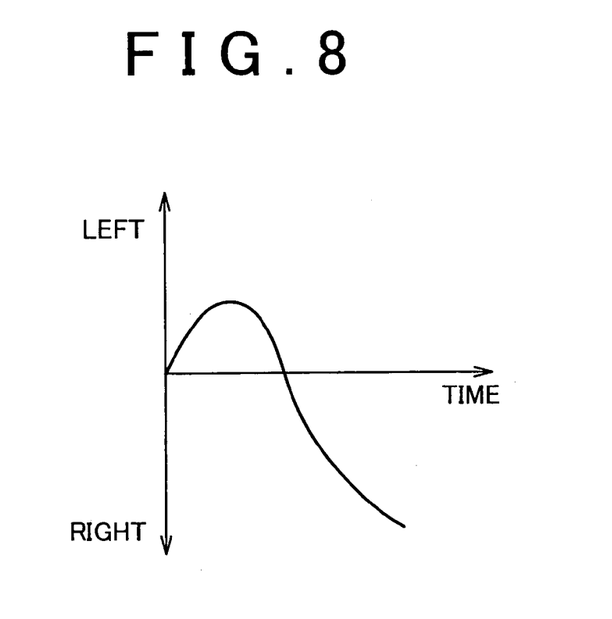
FIG. 8 is a graph for describing the operation of the vehicle suspension system.

As mentioned above, if setting is made such that $\Delta P_R\times S_R<\Delta P_F\times S_F$ is satisfied at the early stage of steering for left turn and $\Delta P_R\times S_R>\Delta P_F\times S_F$ is satisfied during the other times, the piston assembly 72 initially moves leftward and then moves rightward, as shown in FIG. 8. Namely, the damping force on the rear wheel side is increased at the early stage of rolling and then the damping force on the front wheel side is increased, as compared to the case where the control cylinder 30 is not provided.

Generally, in a vehicle of front engine rear drive and front steering, it is preferable that the percentage of the damping force on the rear wheel side is high, i.e., the damping force on the rear wheel side increases, at the early stage of steering, and then the percentage of the damping force on the front wheel side is high, i.e., the damping force on the front wheel side increases. If the percentage of the damping force on the rear wheel side is made high at the early stage of steering, steering response of the vehicle is increased. In the steering limit region, if the percentage of the damping force on the front wheel side is made high, occurrence of spin is suppressed, which is advantageous to securing of the stability. According to the embodiment, it is easy to satisfy the requirement.

When pitching occurs in the vehicle, for example, if a distance between the wheel side member 40 and the vehicle body side member 42 increases on the front side in the vehicle and the distance decreases on the rear side in the vehicle, the fluid pressure of the absorber chamber 54 of each of the shock absorber 20 corresponding to the left front wheel 10 and the shock absorber 22 corresponding to the right front wheel 12 increases, and the fluid pressure of the absorber chamber 54 of each of the shock absorber 24 corresponding to the left rear wheel 14 and the shock absorber 26 corresponding to the right rear wheel 16 decreases. The fluid pressure which is applied to the outer side pressure-receiving surface 170 and the fluid pressure which is applied to the outer side pressure-receiving surface 176 increase, and the fluid pressure which is applied to the inner side pressure-receiving surface 172 and the fluid pressure which is applied to the inner side pressure-receiving surface 174 decrease. In this case, the amount of increase in the fluid pressure of the absorber chambers 54 of the shock absorbers 20 corresponding to the left front wheel 10 is substantially equal to the amount of increase in the fluid pressure of the absorber chamber 54 of the shock absorber 22 corresponding to the right front wheel 12, and the fluid pressures are applied to the inner side pressure-receiving surfaces 172 and 174. The amount of decrease in the fluid pressure of the absorber chambers 54 of the shock absorber 24 corresponding to the left rear wheel 14 is substantially equal to the amount of decrease in the fluid pressure of the absorber chamber 54 of the shock absorber 26 corresponding to the right rear wheel 16 are substantially, and the fluid pressures are applied to the outer side pressure-receiving surfaces 170 and 176. Therefore, the balance of the forces applied to the piston assembly 72 does not change, and the piston assembly 72 does not move. The shock absorbers 20 to 26 are substantially independent of each other. A large damping force can be obtained in each of the shock absorbers 20 to 26 in accordance with a relative movement of the wheel side member 40 and the vehicle body side member 42 (in accordance with a movement of the piston 52), and the pitching speed of the vehicle can be suppressed.

In contrast to this, when one of the four wheels, for example, the left front wheel 10 runs on a bump on a road, namely, when a force that is applied in the direction in which the distance between the wheel side member 40 and the vehicle body side member 42 decreases is increased, or when a force, which moves the wheels diagonally opposite to each other in the same direction, is increased, for example, when a force that is applied to the shock absorbers 20 and 26 and that is applied in the direction in which the distance between the wheel side member 40 and the vehicle body side member 42 decreases is increased, the fluid pressure of the absorber chambers 54 of each of the shock absorbers 20 and 26 decreases, and the fluid pressure of the absorber chambers 54 of each of the shock absorbers 22 and 24 increases. The fluid pressure which is applied to the inner side pressure-receiving surface 172 and the fluid pressure which is applied to the outer side pressure-receiving surface 176 decrease, and the fluid pressure which is applied to the outer side pressure-receiving surface 170 and the fluid pressure which is applied to the inner side pressure-receiving surface 174 increase. Therefore, the piston assembly 72 moves leftward in FIG. 1. As a result, the volume of each of the fluid chambers 164 and 162 decreases, and the volume of each of the fluid chambers 160 and 166 increases. Accordingly, the operating fluid flows out of the shock absorbers 22 and 24, and flows into the shock absorbers 20 and 26. Communication between the shock absorbers 20 and 26, and the shock absorbers 22 and 24 is permitted through the control cylinder 30, and transfer of the operating fluid is substantially performed between these shock absorbers. As a result, the pressure difference between the absorber chambers 54 and 56 decreases in each of the shock absorbers 20 to 26, and the speed of the operating fluid flowing through the throttle device 58 decreases, which decreasing the damping force. Accordingly, it is possible to easily make the wheels come close to or be apart from the vehicle body, and easily move the wheels diagonally opposite to each other in the same direction. As a result, movement of the vehicle body in the vertical direction is suppressed.

As described so far, with the vehicle suspension system according to the embodiment, it is possible to permit easy movement of one wheel or easy movement of the wheels diagonally opposite to each other in the same direction, and suppress pitching. Also, when the vehicle is turning, the percentage of the damping force on the rear wheel side is increased at the early stage of turning (at the beginning of turning), and then the percentage of the damping force on the front wheel side is increased by the operation of the control cylinder 30. Therefore, it is possible to make the percentage of the damping force on the rear wheel side high in the early stage of turning, and then make the percentage of the damping force on the front wheel side high. It is therefore possible to easily satisfy both of the requirements; that are, securing of steering response of the vehicle and securing of running stability, which are generally thought to be difficult to satisfy simultaneously. The effects of the invention can be obtained if the percentage of the damping force on the rear wheel side is increased at the early stage of turning (at the beginning of turning) and then the percentage of the damping force on the front wheel side is increased. Therefore, it is not necessary to actually make the damping force on the front wheel side larger than the damping force on the rear wheel side at the early stage of turning.

Further, according to the embodiment, although there are errors in manufacturing and assembly of the cylinder housing 70 and the piston assembly 72, easy movement of the piston assembly 72 is secured due to relative movement of the partition member 88 with respect to the housing body portion 80. Accordingly, it is possible to appropriately obtain the above-mentioned effects of the change in the percentage of the damping force.

What is claimed is:

1. A vehicle suspension system, comprising:
   two front wheel side absorbers each of which includes a first absorber chamber and two rear wheel side absorbers each of which includes a second absorber chamber, the front wheel side absorbers and the rear wheel side absorbers being provided between four respective wheel side members that rotatably support four respective wheels and four respective vehicle body side members that correspond to the respective wheel side members on a vehicle body side;
   a control cylinder which includes (a) a piston assembly that is formed by coupling two pistons with each other using a coupling rod and (b) a cylinder housing having two cylinder chambers which are divided by a partition wall, in which the coupling rod penetrates the partition wall fluid-tightly and slidably, and in which the two pistons are fitted in the two respective cylinder chambers fluid-tightly and slidably, whereby two inner side control chambers are formed between the two respective pistons and the partition wall and two outer side control chambers are formed on outer sides of the two respective pistons, which are opposite to sides on which there is the partition wall; and a connection passage which connects the first absorber chambers of the two front wheel side absorbers to one of the respective two outer side control chambers and the respective two inner side chambers, and which connects the second absorber chambers of the two rear wheel side absorbers to the other of the respective two outer side control chambers and the respective two inner side chambers, wherein damping characteristics of the front wheel side absorbers and the rear wheel side absorbers and pressure-receiving areas of the piston assembly for the inner side control chambers and the outer side control chambers are set such that when the vehicle is turning, a direction in which the piston assembly moves stage of turning is opposite to a direction in which the piston assembly moves during the other times.

2. The vehicle suspension system according to claim 1, wherein
the first absorber chambers are connected to the respective inner side control chambers of the control cylinder, and the second absorber chambers are connected to the respective outer side control chambers.

3. The vehicle suspension system according to claim 1, wherein the two front wheel side absorbers are connected to the inner side control chambers, and the two rear wheel side absorbers are connected to the outer side control chambers.

4. The vehicle suspension system according to claim 1, wherein
the two front wheel side absorbers are connected to the outer side control chambers, and the two rear wheel side absorbers are connected to the inner side control chambers.

5. A vehicle suspension system, comprising:
two front wheel side absorbers each of which includes a first absorber chamber and two rear wheel side absorbers each of which includes a second absorber chamber, the front wheel side absorbers and the rear wheel side absorbers being provided between four respective wheel side members that rotatably support four respective wheels and four respective vehicle body side members that correspond to the respective wheel side members on a vehicle body side;

a control cylinder which includes (a) a piston assembly that is formed by coupling two pistons with each other using a coupling rod and (b) a cylinder housing having two cylinder chambers which are divided by a partition wall, in which the coupling rod penetrates the partition wall fluid-tightly and slidably, and in which the two pistons are fitted in the two respective cylinder chambers fluid-tightly and slidably, whereby two inner side control chambers are formed between the two respective pistons and the partition wall and two outer side control chambers are formed on outer sides of the two respective pistons, which are opposite to sides on which there is the partition wall; and a connection passage which connects the first absorber chambers of the two front wheel side absorbers to one of the respective two outer side control chambers and the respective two inner side chambers, and which connects the second absorber chambers of the two rear wheel side absorbers to the other of the respective two outer side control chambers and the respective two inner side chambers, wherein damping characteristics of the front wheel side absorbers and the rear wheel side absorbers and the pressure-receiving areas of the piston assembly for the inner side control chambers and the outer side control chambers are set such that an increasing rate of a damping force of each of the two front wheel side absorbers is made higher than an increasing rate of a damping force of each of the two rear wheel side absorbers by the control cylinder in a region where an operation speed of the front wheel side absorbers and the rear wheel side absorbers is lower than a first predetermine operation speed.

6. The vehicle suspension system according to claim 5, wherein
each of the two front wheel side absorbers further includes a third absorber chamber, and each of the two rear wheel side absorbers further includes a fourth absorber chamber.

7. The vehicle suspension system according to claim 6, wherein
when each of the front wheel side absorbers is being extended, a fluid pressure of the first absorber chamber increases, and
when each of the rear wheel side absorbers is being extended, a fluid pressure of the second absorber chamber increases.

8. The vehicle suspension system according to claim 6, wherein
the first absorber chambers are not connected to gas chambers,
the third absorber chambers are connected to the gas chambers directly or through a piston,
the second absorber chambers are not connected to the gas chambers, and
the fourth absorber chamber are connected to the gas chambers directly or through the piston.

9. The vehicle suspension system according to claim 5, wherein
the damping characteristics of the front wheel side absorbers and the rear wheel side absorbers and the pressure-receiving areas of the piston assembly are set such that the damping force of each of the rear wheel side absorbers is increased by the cylinder while the damping force of each of the front wheel side absorbers is decreased by the cylinder in a region where the operation speed of the front wheel side absorbers and the rear wheel side absorbers is lower than a second predetermined operation speed, and the damping force of each of the rear wheel side absorbers is decreased by the cylinder while the damping force of each of the front wheel side absorbers is increased by the cylinder in a region where the operation speed of the front wheel side absorbers and the rear wheel side absorbers is higher than the second predetermined operation speed.

10. The vehicle suspension system according to claim 5, wherein
the damping characteristics of the front wheel side absorbers and the rear wheel side absorbers and the pressure-receiving areas of the piston assembly are set such that the damping force of each of the rear wheel side absorbers is larger than the damping force of each of the front wheel side absorbers in a region where the operation speed of the front wheel side absorber and the rear wheel side absorber is lower than a third predetermined operation speed, and the damping force of each of the front wheel side absorbers is larger than the damping force of each of the rear wheel side absorbers in a region where the operation speed of the front wheel side absorbers and the rear wheel side absorbers is higher than the third predetermined operation speed.

11. The vehicle suspension system according to claim 5, wherein the first absorber chambers are connected to the respective inner side control chambers of the control cylinder, and the second absorber chambers are connected to the respective outer side control chambers.

* * * * *